US011403804B2

(12) United States Patent
Ilola et al.

(10) Patent No.: US 11,403,804 B2
(45) Date of Patent: Aug. 2, 2022

(54) METHOD FOR REAL TIME TEXTURE ADAPTATION

(71) Applicant: Nokia Technologies Oy, Espoo (FI)

(72) Inventors: Lauri Ilola, Tampere (FI); Lukasz Kondrad, Munich (DE); Emre Aksu, Tampere (FI); Miska Matias Hannuksela, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/134,711

(22) Filed: Dec. 28, 2020

(65) Prior Publication Data

US 2021/0209829 A1 Jul. 8, 2021

Related U.S. Application Data

(60) Provisional application No. 62/956,889, filed on Jan. 3, 2020.

(51) Int. Cl.
*G06T 1/20* (2006.01)
*G06T 1/60* (2006.01)
*G06T 15/00* (2011.01)

(52) U.S. Cl.
CPC .............. *G06T 15/005* (2013.01); *G06T 1/20* (2013.01); *G06T 1/60* (2013.01)

(58) Field of Classification Search
CPC .......... G06T 1/20; G06T 1/60; G06T 15/005; H04N 21/26258; H04N 21/44012;
(Continued)

(56) References Cited

U.S. PATENT DOCUMENTS

2010/0118039 A1\* 5/2010 Labour ...................... G06T 1/60
345/522
2015/0382050 A1\* 12/2015 Le Nerriec ............. H04L 43/16
725/80

(Continued)

OTHER PUBLICATIONS

MPEG-I Architectures, MPEG document n18344. MPEG Document Management System, 126th meeting: Geneva [online], Mar. 30, 2019,[retrieved on Apr. 1, 2021]. Retrieved from <http://dms.mpeg.expert/> sections 2, 3.4.1, 3.4.3; Figs. 4, 7-9.

(Continued)

*Primary Examiner* — Jacinta M Crawford
(74) *Attorney, Agent, or Firm* — Joseph C. Drish; Harrington & Smith

(57) ABSTRACT

An apparatus includes at least one processor; and at least one non-transitory memory including computer program code; wherein the at least one memory and the computer program code are configured to, with the at least one processor, cause the apparatus at least to perform: receive a scene description comprising data associated with a scene; place the data associated with the scene into data buffers and create command buffers; adapt the data placed within the data buffers and synchronize the data within the data buffers with information provided from local media or network media; signal information about the adaptation to update the command buffers that command a renderer; and render the scene using the data within the data buffers and the command buffers.

18 Claims, 5 Drawing Sheets

(58) Field of Classification Search
CPC ............ H04N 21/8146; H04N 21/816; H04N 21/8456; H04N 21/85406
USPC ...................................... 345/522, 530, 582
See application file for complete search history.

(56) References Cited

U.S. PATENT DOCUMENTS

2017/0345203 A1    11/2017   Labour et al.
2018/0004688 A1*   1/2018    Chung ................ G06F 13/1673

OTHER PUBLICATIONS

Bouazizi, I. et al. glTF 2.0 extensions for MPEG-I, MPEG document m51014. MPEG Document Management System, 128th meeting: Geneva [online], Oct. 2, 2019, [retrieved on Mar. 29, 2021]. Retrieved from <http://dms.mpeg.expert/> sections 1, 2.2.1, 2.2.2; Fig. 1.
Considerations for a WD on MPEG-I Scene Descriptions, MPEG document n18869. MPEG Document Management System, 128$^{th}$ meeting: Geneva [online], Oct. 11, 2019, [retrieved on Mar. 29, 2021]. Retrieved from <http://dms.mpeg.expert/> sections 1-2, 3.2.
Gltf overview. GitHub.com [online], Jan. 5, 2019, [retrieved on Apr. 9, 2021]. Retrieved from <http://github.com/javagl/gltfOverview/releases/download/v2.0.0b/gltfOverview-2.0.0b-8pages.pdf> the whole document.

* cited by examiner

METHOD FOR REAL TIME TEXTURE ADAPTATION

RELATED APPLICATION

This application claims priority to US Provisional Application No. 62/956,889, filed Jan. 3, 2020, which is hereby incorporated by reference in its entirety.

TECHNICAL FIELD

The examples and non-limiting embodiments relate generally to multimedia and software, and more particularly, to a method for real time texture adaptation.

BACKGROUND

It is known to perform video coding and decoding.

SUMMARY

In accordance with an aspect, an apparatus includes at least one processor; and at least one non-transitory memory including computer program code; wherein the at least one memory and the computer program code are configured to, with the at least one processor, cause the apparatus at least to perform: receive a scene description comprising data associated with a scene; place the data associated with the scene into data buffers and create command buffers; adapt the data placed within the data buffers and synchronize the data within the data buffers with information provided from local media or network media; signal information about the adaptation to update the command buffers that command a renderer; and render the scene using the data within the data buffers and the command buffers.

In accordance with an aspect, a method includes receiving a scene description comprising data associated with a scene; placing the data associated with the scene into data buffers and creating command buffers; adapting the data placed within the data buffers and synchronizing the data within the data buffers with information provided from local media or network media; signaling information about the adaptation to update the command buffers that command a renderer; and rendering the scene using the data within the data buffers and the command buffers.

In accordance with an aspect, a non-transitory program storage device readable by a machine, tangibly embodying a program of instructions executable by the machine for performing operations is provided, the operations comprising: receiving a scene description comprising data associated with a scene; placing the data associated with the scene into data buffers and creating command buffers; adapting the data placed within the data buffers and synchronizing the data within the data buffers with information provided from local media or network media; signaling information about the adaptation to update the command buffers that command a renderer; and rendering the scene using the data within the data buffers and the command buffers.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
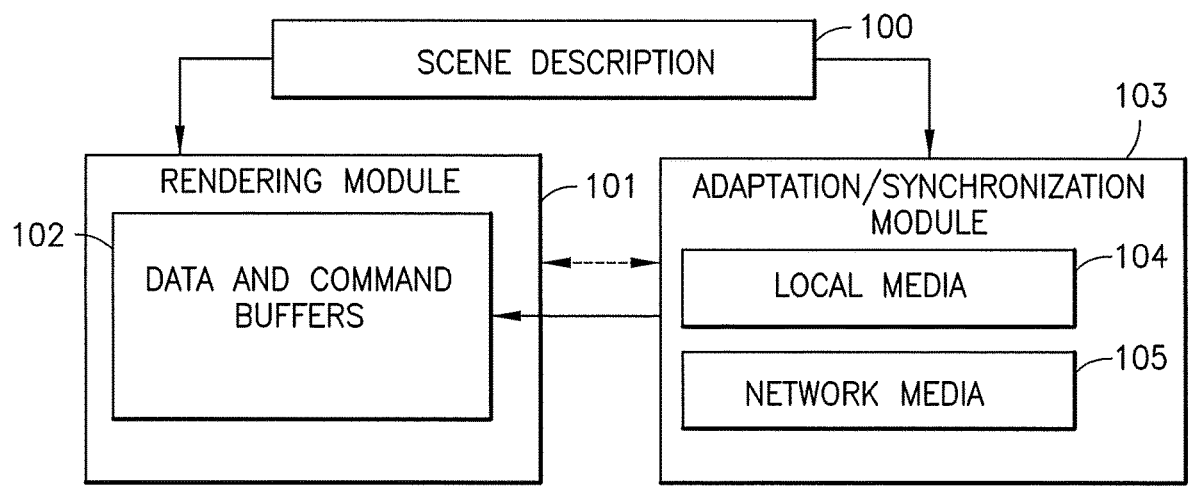
FIG. 1 illustrates a high-level block diagram of an implementation of real time texture adaptation.

The following acronyms and abbreviations that may be found in the specification and/or the drawing figures are defined as follows:

2D or 2d two-dimensional
3D or 3d three-dimensional
3GP-DASH Progressive Download and Dynamic Adaptive Streaming over HTTP
3GPP 3rd Generation Partnership Project
4CC four-character code
API application programming interface
assoc association
AHS adaptive HTTP streaming
altr alternate
Amd amendment
AVC advanced video coding
.bin binary file
CM conditionally mandatory status in XML
CPU central processing unit
DASH Dynamic Adaptive Streaming over HTTP
dinf DataInformationBox
DRM digital rights management
EBML Extensible Binary Meta Language
GL graphics library or graphics language
GLB binary file format representation of 3D models saved in the GL Transmission Format
GLTF or gltf GL Transmission Format
.gltf JSON-formatted file
GPU graphics processing unit
hdlr handler box
HEVC High Efficiency Video Coding
HTTP HyperText Transfer Protocol
HTTP GET method used to request a resource from the server
ID or id identifier
idat item data box
IEC International Electrotechnical Commission
ISO International Organization for Standardization
ISOBMFF ISO Base Media File Format
JPEG Joint Photographic Experts Group
.jpg JPEG file extension for an image file
JSON JavaScript Object Notation
leva level assignment
M mandatory status in XML
mdat Media Data Box
MIME Multipurpose Internet Mail Extensions
moov Movie Box
moof Movie Fragment Boxes
mvex movie extends
MP4 filename extension for MPEG-4 Part 14 files
MPD media presentation description
MPEG moving picture experts group
MPEGI MPEG immersive
O optional status in XML
OD optional with default mandatory status in XML OMAF Omnidirectional Media Format
OpenGEX Open Game Engine Exchange
.png Portable Network Graphics image file
PSS packet-switched streaming
RFC request for comments
SMIL Synchronized Multimedia Integration Language
SRD spatial relationship description
ssix subsegment index
trak TrackBox
TS technical specification
URI uniform resource identifier
URL uniform resource locator
URN Uniform Resource Name
VWPT viewpoint information
XML extensible markup language Box-structured file formats. Box-structured and hierarchical file format concepts have been widely used for media storage and sharing. The most well-known file formats in this regard are the ISO Base Media File Format (ISOBMFF) and its variants such as MP4 and 3GPP file formats.

ISOBMFF allows storage of timely captured audio/visual media streams, called media tracks. The metadata which describes the track is separated from the encoded bitstream itself. The format provides mechanisms to access media data in a codec-agnostic fashion from file parser perspective.

A basic building block in ISOBMFF is called a box. Each box has a header and a payload. The box header indicates the type of the box and the size of the box in terms of bytes. Box type is typically identified by an unsigned 32-bit integer, interpreted as a four-character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, ISOBMFF may be considered to specify a hierarchical structure of boxes.

In files conforming to the ISO base media file format, the media data may be provided in one or more instances of MediaDataBox (mdat) and the MovieBox (moov) may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise timed metadata tracks.

Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A timed metadata track may refer to samples describing referred media samples.

Alternate tracks. ISOBMFF contains a particular feature called "alternate tracks". This feature enables signaling any time-wise equivalent alternatives of a media. This is signaled using a particular field in the track header box (from ISOBMFF specification—ISO/IEC 14496-12):

```
aligned(8) class TrackHeaderBox
    extends FullBox('tkhd', version, flags){
    if (version==1) {
        unsigned int(64)    creation_time;
        unsigned int(64)    modification_time;
        unsigned int(32)    track_ID;
        const unsigned int(32)        reserved = 0;
        unsigned int(64)    duration;
    } else { // version==0
        unsigned int(32)    creation_time;
        unsigned int(32)    modification_time;
        unsigned int(32)    track_ID;
        const unsigned int(32)        reserved = 0;
        unsigned int(32)    duration;
    }
    const unsigned int(32)[2]            reserved = 0;
    template int(16) layer = 0;
    template int(16) alternate_group = 0;
    template int(16)   volume = {if track_is_audio 0x0100 else 0};
    const unsigned int(16)    reserved = 0;
    template int(32)[9]    matrix=
        { 0x00010000,0,0,0,0x00010000,0,0,0,0x40000000 };
        // unity matrix
    unsigned int(32) width;
    unsigned int(32) height;
}
``` alternate_group is an integer that specifies a group or collection of tracks. If this field is 0 there is no information on possible relations to other tracks. If this field is not 0, it should be the same for tracks that contain alternate data for one another and different for tracks belonging to different such groups. Only one track within an alternate group should be played or streamed at any one time, and must be distinguishable from other tracks in the group via attributes such as bitrate, codec, language, packet size etc. A group may have only one member.

Typically, alternate grouping field indicates alternatives of a media track such as:

Different languages of the same audio track
Different resolution or bitrate options of the same media track
Different view of the 2D scene which is time-wise aligned with the main 2D scene (i.e. different camera angle)

Only one media track among the alternatives should be played back during the presentation time. This restriction comes from the ISOBMFF specification and the alternate_group field definition. The playback behavior for playing back multiple such media tracks is undefined.

Media players typically read the alternate grouping information and create a tree-structured information which groups the tracks together and then select the first track (i.e. lowest indexed) in the alternative tracks for initial playback. Moreover, the user can also manually switch between the alternatives.

Track groups. TrackGroupBox is contained by a TrackBox. TrackGroupBox enables indication of groups of tracks, where each group shares a particular characteristic or the tracks within a group have a particular relationship. TrackGroupBox contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. Track groups are not used to indicate dependency relationships between tracks. Instead, the TrackReferenceBox is used for such purposes.

The syntax of TrackGroupBox is the following:

```
aligned(8) class TrackGroupBox('trgr') {
}
aligned(8) class TrackGroupTypeBox(unsigned int(32)
track_group_type) extends FullBox(track_group_type, version
= 0, flags = 0)
{
    unsigned int(32) track_group_id;
    // the remaining data may be specified for a particular
track_group_type
}
```

Items. Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating, the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents.

The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

Entity groups. Entity groups have been specified in ISO/IEC 14496-12:2015/Amd.2:2018. An entity group is a grouping of items, which may also group tracks. The entities in an entity group share a particular characteristic or have a particular relationship, as indicated by the grouping type.

Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track. When GroupsListBox is present in a file-level MetaBox, there is no item_ID value in ItemInfoBox in any file-level MetaBox that is equal to the track_ID value in any TrackHeaderBox.

GroupsListBox contains EntityToGroupBoxes, each specifying one entity group. The four-character box type of EntityToGroupBox denotes a defined grouping type.

The 'altr' entity grouping type has been specified as follows: The items and tracks mapped to this grouping are alternatives to each other, and only one of them should be played (when the mapped items and tracks are part of the presentation; e.g. are displayable image items or tracks) or processed by other means (when the mapped items or tracks are not part of the presentation; e.g. are metadata). A player should select the first entity from the list of entity_id values that it can process (e.g. decode and play for mapped items and tracks that are part of the presentation) and that suits the application needs. Any entity_id value shall be mapped to only one grouping of type 'altr'. An alternate group of entities consists of those items and tracks that are mapped to the same entity group of type 'altr'.

Dynamic Adaptive Streaming over HTTP (DASH). DASH is an adaptive bitrate streaming technique that enables high quality streaming of media content over the Internet delivered from conventional HTTP web servers.

MPEG-DASH. Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs").

MPEG took 3GPP AHS Release 9 as a starting point for the MPEG DASH standard (ISO/IEC 23009-1: "Dynamic adaptive streaming over HTTP (DASH)-Part 1: Media presentation description and segment formats"). MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the examples described herein are not limited to DASH, but rather the description is given for one possible basis on top of which the examples described herein may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request.

To play the content, the DASH client may obtain the MPD by using HTTP, email, thumb drive, broadcast, or other transport methods, for example. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using HTTP GET requests, for example. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure a media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, such as by bitrate, resolution, language, codec, or the like, for example. The Segment contains a certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs><maxOccurs>. Attributes in an XML document may be identified by a lower-case first letter as well as they may be preceded by a '@'-sign, e.g. @attribute, for example. To point to a specific attribute @attribute contained in an element Element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements are typically structured in the same way, in that they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH specifies a Viewpoint element that is formatted as a property descriptor. The @schemeIdUri attribute of the Viewpoint element is used to identify the viewpoint scheme employed. Adaptation Sets containing non-equivalent Viewpoint element values contain different media content components. The Viewpoint elements may equally be applied to media content types that are not video. Adaptation Sets with equivalent Viewpoint element values are intended to be presented together. This handling should be applied equally for recognized and unrecognized @schemeIdUri values.

SRD (Spatial Relationship Description) is specified in the normative Annex H of MPEG-DASH. The following contains some excerpts of the SRD specification. The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD shall be contained exclusively in these two MPD elements (AdaptationSet and SubRepresentation).

Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in a SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, i.e. after the object_x and object_width values are divided by the total_width value and the object_y and object_height values divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at a same resolution level. This way, the spatial_set_id parameter may be used by the DASH client to quickly select spatially related Spatial Objects.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments to enable downloading segments in multiple parts, for example. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If a relatively long Segment duration is used, then Subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid, for example. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. In case the @level attribute is present in the SubRepresentation element, the following applies.

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate.

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used, the following applies:

- The Initialization Segment contains the Level Assignment box.
- The Subsegment Index box ('ssix') is present for each Subsegment.
- The attribute @level specifies the level to which the described Sub-Representation is associated to in the Subsegment Index. The information in Representation, Sub-Representation and in the Level Assignment ('leva') box contains information on the assignment of media data to levels.
- Media data should have an order such that each level provides an enhancement compared to the lower levels.

If the @level attribute is absent, then the SubRepresentation element is solely used to provide a more detailed description for media streams that are embedded in the Representation.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to a particular temporal level using the Temporal Level sample grouping (and the same can be repeated for all TemporalId values). The Level Assignment box can then refer to the Temporal Level sample grouping in the indicated mapping to levels.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding flag in the Level Assignment Box indicates whether this missing data can be replaced by zeros. If not, the sample data for samples assigned to levels that are not accessed is not present, and care should be taken.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

OMAF defines MPEG-DASH elements for associating various DASH elements. A SupplementalProperty element with a @schemeIdUri attribute equal to "urn:mpeg:mpegI:

omaf:2018:assoc" is referred to as an association descriptor. One or more association descriptors may be present at adaptation set level, representation level, preselection level. An association descriptor included inside an adaptation set/representation/preselection element indicates that the parent element of this element's descriptor (i.e. adaptation set/representation/preselection element) is associated with one or more elements in the MPD indicated by the XPath query in the omaf2:Association element and the association type signalled by omaf2:@associationKindList.

In OMAF DASH MPD, a Viewpoint element with a @schemeIdUri attribute equal to "urn:mpeg:mpegI:omaf:2018:vwpt" is referred to as a viewpoint information (VWPT) descriptor.

At most one VWPT descriptor may be present at adaptation set level and no VWPT descriptor shall be present at any other level. When no Adaptation Set in the Media Presentation contains a VWPT descriptor, the Media Presentation is inferred to contain only one viewpoint.

The @value Specifies the viewpoint ID of the viewpoint. The ViewPointInfo is Container element whose sub-elements and attributes provide information about the viewpoint. The ViewPointInfo@label attribute specifies a string that provides human readable label for the viewpoint. The ViewPointInfo.Position attributes of this element specify the position information for the viewpoint.

GLTF. The GL Transmission Format (glTF) is an API-neutral runtime asset delivery format. glTF bridges the gap between 3D content creation tools and modern 3D applications by providing an efficient, extensible, interoperable format for the transmission and loading of 3D content.

glTF assets are JSON files plus supporting external data. Specifically, a glTF asset is represented by:
 A JSON-formatted file (.gltf) containing a full scene description: node hierarchy, materials, cameras, as well as descriptor information for meshes, animations, and other constructs
 Binary files (.bin) containing geometry and animation data, and other buffer-based data
 Image files (.jpg, .png) for textures Assets defined in other formats, such as images, may be stored in external files referenced via URI, stored side-by-side in GLB container, or embedded directly into the JSON using data URIs.

glTF has been designed to allow extensibility. While the initial base specification supports a rich feature set, there may be many opportunities for growth and improvement. glTF defines a mechanism that allows the addition of both general-purpose and vendor-specific extensions.

Due to the movement of a user within a scene a distance between a user and objects in a scene changes. As a result, the required level of details of a texture of a visible object also fluctuates.

In computer graphics mipmaps are used to increase rendering efficiency. These are pre-calculated optimized sequences of images, each of which is a progressively lower resolution representation of the same image. A high-resolution mipmap image is used for high-density samples, such as for objects close to the camera. Lower-resolution images are used as the object appears farther away. Mipmaps are generated from high resolution textures which need to be present in the target system.

Regardless of the mipmap resolution used by a renderer at a given time, the input for mipmap generation may need to be in high resolution. Such computation and memory transfer time from CPU to GPU is a waste of resources. It would be appropriate that a renderer does not have to fetch and upload high resolution texture data when visibly it won't make a difference. Traditionally this approach would require that all images are provided to the application before the rendering starts, which would mean a considerable amount of data to be stored, transferred and processed.

Similar problem appears when a renderer must be ready for change of user view direction, where due to the head movement and view blur a low-resolution image may be sufficient even though the object is close to observer.

Part of texture adaptation may be brought to network level allowing applications to stream texture data adaptively at different levels of detail based on required rendering accuracy of an object. This would also enable other flavors for adaptation such as bitrate adaptation. Such techniques are not supported by current scene description specifications (e.g. glTF).

Furthermore, it would be beneficial if a scene could use texture that changes its characteristic over time. An example would be a texture that has baked information (e.g. shadows, lights and reflections). Timed textures that are updated on constant basis require the calculation of mipmaps to be performed for each frame. In this scenario the waste of bandwidth and computational resources is even more excessive. Additionally, possibility of using timed media does not exist in current scene description specifications (e.g. glTF).

Furthermore, traditionally texture data is combined into larger atlases to reduce CPU-GPU loading times. By introducing timed media one may combine texture patches into tracks that share the same timeline, e.g. using ISOBMFF. This would allow the baked effects to be synchronized on the MPEG systems level, rather than having to perform complex client side synchronization of timed data. Additionally such atlases may be generated regionally, which may enable scaling texture object data based on where the objects are located in the scene.

Problems solved by the examples described herein include:
 Mipmap generation for objects far away from the camera still require high resolution textures for input, when less details would be enough for rendering.
 Computer generated scene delivery formats are self-contained and all data including texture information needs to be present before the rendering starts. This limitation requires that all versions of the textures of the same object must be present which increases the size of the exchange format.
 Computer generated scene delivery formats supports only image media such as jpeg and png, which provide texture attributes for a mesh. This limitation does not allow pre-baked time changing lighting information.
 Even, if other formats for storing texture, including timed formats, are used, synchronization between the textures is a crucial component. Especially when the texture contains pre-baked lighting information.
 Encapsulating all texture in one frame (i.e. atlas) is impractical due to the increase of the amount of texture data and the limitation of the video codec resolution.
 When time dependent baked textures are required for a scene, making high-resolution texture data available for far away objects wastes bandwidth and computational resources every frame, thus increasing the waste of resources multiple times over.
 Synchronized Multimedia Integration Language (SMIL). SMIL is one way of orchestrating and synchronizing media, which focuses on 2d domain. It does not offer the tools for adaptation and synchronization of texture data for 3d objects.

OpenGEX. OpenGEX is designed for sharing 3d scene assets. It is conceptually like glTF, which means it also lacks ability to handle timed media or streaming related aspects.

To avert the need to use high resolution texture data as input for mipmap calculations, a renderer fetches the appropriate data based on the adaptation element input. The adaptation input can be determined based on the viewer position in the scene, based on the viewer prior actions (e.g. head movement).

To ensure that data is synchronized between number of objects rendered in a scene a single time media with number of tracks/adaptation sets and common timeline is used to store the data.

To minimize the initial amount of data required at the start of the rendering the adaptation of data can be brought to network level allowing applications to stream data adaptively at different levels of detail based on required rendering accuracy of an object or region. This may also enable other flavors for adaptation such as bitrate or codec adaptation.

Allowing alternatives for data, a minimal quality can be provided as a local file while any additional details can be provided by the network element and does not have to be present at the start of the rendering. Alternatives also allows to address wider range of end devices which may differ in supported media formats.

FIG. 1 illustrates a high-level block diagram of an implementation of real time texture adaptation. Block 100 depicts a scene description format that contains a full scene description: node hierarchy, materials, cameras, as well as descriptor information for meshes, animations, and other constructs, may include binary files containing geometry and animation data, and other buffer-based data.

Figure 2:
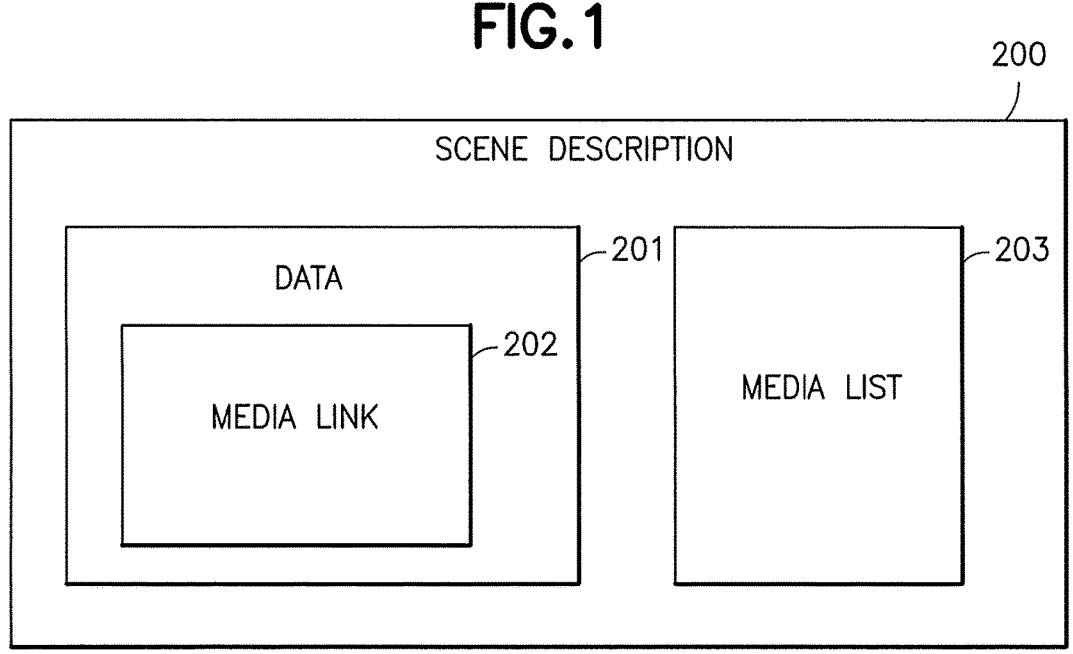
FIG. 2 is a block diagram of a scene description.

Block 100 is presented in more detail on FIG. 2 as a block 200. FIG. 2 is a block diagram of a scene description. Block 200 contains all related data mentioned above in block 201. According to the examples described herein the scene description 200 includes also timed media information that can be in the form of a local binary data (e.g. ISOBMFF) or in a form of media description (e.g. DASH MPD) that can be fetched through a network. To facilitate the method new blocks 202 and 203 are added to a scene description entity.

The block 203 provides a list of all timed media that can be used in the scene description. The block 203 may contain an alternative of a given media in the form of different files (e.g. files contain data that was encoded using different encoding tools, or files of different formats). The block 203 may contain also files that itself may have an alternative in the form of alternative tracks (e.g. in ISOBMFF) or alternative Representations (e.g. in DASH MPD). The block 203 provides functionality to differentiate those alternatives.

The block 202 allows to link the block 203 to already existing structures of block 201 in a scalable manner.

According to the examples described herein, scene description (100,200) is provided to rendering (101) and to adaptation/synchronization (103). Rendering (101), based on the description, initializes the scene including creation of data and command buffers (102). Those buffers are used by the rendering 101 to fetch and render the data. As the Scene Description (100/200) provides the adaptation and synchronization in scalable manner, a renderer can start operating before/despite any interaction with adaptation (103).

According to the examples described herein, rendering (101) interacts with adaptation/synchronization (103) and provides information based on which the adaptation is performed. An example of such adaptation information is the current position of a user in a scene and orientation/size of the viewing frustum. In another embodiment, a margin information for the viewing frustum, orientation could be also signaled as adaptation information. This adaptation allows the renderer (101) to update data and command buffers (102) based on object visibility.

According to the examples described herein, adaptation/synchronization (103) is responsible for deciding which version of the media should be decoded and placed in data buffers (102). Adaptation/synchronization (103) can use local media (104) or media that should be fetched through the network (105). The adaptation/synchronization (103) is also responsible for decoding and placing the data in data buffers (102) synchronized according to the information provided with local media (104) (e.g. composition time of ISOBMFF) or networked media (105) (e.g. timing information of Periods in DASH MPD). Adaptation/synchronization (103) should also instruct the renderer about adaptation so that command buffers (103) may be properly updated for render passes.

The scene description (100/200) may be according to glTF specification. In this case media list (203) may be an extension to glTF specification.

In another embodiment, the scene description (100/200) may be stored as an entity in an object-based file (e.g. an ISOBMFF compliant file, such as an MP4 file) which can be addressable and retrievable via a specific media handler. Such data could be stored as metadata inside the file (e.g. as an item inside and/or referred to by the 'meta' box).

Media list (203) provides an array of media items. A media item contains an array of alternatives representing the same data. The array may have one or more entries. For each alternative one or more of the following items of information may be provided: uri, mimeType and tracks information.

The item uri provides absolute or relative URI of the media. In case relative paths are provided then those paths are relative to the main file location (e.g. location of the .gltf file in the directory tree structure). Alternatively, media can be referenced by bufferView index. In this case the media is stored as part of a binary blob.

The item mimeType provides the MIME type of the media. mimeType may include a 'codecs' sub-parameter, that allows for unambiguous specification of the codecs contained within file format.

The item tracks is an array that provides a list of all tracks within the media. Each item provides track access information.

In an embodiment, in case of DASH and ISOBMFF file, the access information is in the form of URL fragments. To address a specific Adaptation Set within DASH manifest MPD anchors as defined in ISO/IEC 23009-1 may be used. To address a specific track with mp4 file URL fragments as specified in ISO/IEC 14496-12 may be used.

In an embodiment, one or more of the following URL fragment schemes are specified and used for ISOBMFF:
  alternate_group=<alternate_group>, identifying the alternate group with the value of alternate_group of TrackHeaderBox
  track_group=<track_group_type.track_group_id>, identifying the track group with the given track_group_type four-character code and the value of track_group_id
  entity_group=<grouping_type.group_id>, identifying the entity group with the given grouping_type four-character code and the value of group_id In an embodiment, an entry in the media list refers to a set of alternatives representing the same media data as indicated within the referenced entry. For example, the #track URL fragment for an MPD references an Adaptation Set, which may be contain multiple Representations that are alternatives to each other. In another example, any of the above-specified URL fragment schemes for ISOBMFF may be used for indicating a group of tracks.

In an embodiment, the access information is in the form of a URL query string.

In an embodiment, in case of DASH MPD or any other media presentation description using XML, the access information is in the form of an xPath query string, which resolves into one or more media alternatives. For example, a given xPath query string may resolve to an Adaptation Set within an MPD.

In an embodiment, the tracks information is embedded into uri instead of or in addition to having the tracks information as a separate parameter for an entry. For example, if tracks information were a URL fragment or a URL query string, it may be embedded into uri.

Media list (203) may be an extension according to the glTF specification. In the example below, media list (203) (MPEG_media) lists two media items. The first media item contains only an item within alternatives which is a DASH manifest that contains one track. Even though there are no alternatives at the media item level, DASH manifest may still have different Representation within Adaptation Set. The second media item contains two items within alternatives. The first one lists an mp4 file that contains data compressed using an AVC codec while the second one lists an mp4 file that contains data compressed using a HEVC codec. Each item within alternatives array has to have the same amount of track items within tracks object. However, each track item may contain different information, which depends on the structure of the MP4 file. In another embodiment, track Id values of NULL (e.g. equals to 0 or null) or empty track items (e.g. ' ') or 32 bit maxInt value (e.g. 0xFFFF) may be provided to indicate non-present alternatives, or the same track ID may be used for different alternative listings.

```
{
    "extensions": {
        "MPEG_media": {
            media: [
                {
                    "name": "source 0",
                    "alternatives": [
                        {
                            "mimeType": "application/dash+xml",
                            "uri": "manifest.mpd",
                            "tracks": [
                                {
                                    "track": "#track=1"
                                }
                            ]
                        }
                    ]
                },
                {
                    "name": "source 1",
                    "alternatives": [
                        {
                            "mimeType":
"video/mp4;codecs=\"avc1.42E01E\"",
                            "uri": "video1.mp4",
                            "tracks": [
                                {
                                    "track": "#track_ID=1"
                                },
                                {
                                    "track": "#track_ID=2"
                                }
                            ]
```

-continued

```
                        },
                        {
                            "mimeType":
"video/mp4;codecs=\"hev1.1.6.L93.B0\"",
                            "uri": "video2.mp4",
                            "tracks": [
                                {
                                    "track": "#track_ID=3"
                                },
                                {
                                    "track": "#track_ID=1"
                                }
                            ]
                        }
                    ]
                }
            ]
        }
    }
}
```

Media link (202) may be an extension to a source element of a texture array according to the glTF specification.

Media link (202) provides the possibility to link a texture object to a media and its respective track listed by Media list (203).

In the example below, two texture items are listed. Each texture item uses Media link (202) (MPEG_video_texture). The first texture item is linked with source 1 listed by Media list (203) and track 0. The second texture item is linked with the same source 1 listed by Media list (203) but with a different track, track 0.

```
{
    "textures": [
        {
            "sampler": 0,
            "source": 1,
            "extensions": {
                "MPEG_video_texture": {
                    "source": 1,
                    "track": 0
                }
            }
        },
        {
            "sampler": 1,
            "source": 0,
            "extensions": {
                "MPEG_video_texture": {
                    "source": 1,
                    "track": 1
                }
            }
        }
    ]
}
```

Media link (202) and Media list (203) schemas can be as follows:

```
MPEG_video_texture.schema.json
{
    "$schema" : "http://json-schema.org/draft-04/schema",
    "title" : "MPEG_video_texture extension",
    "type" : "object",
    "description": "glTF extension to specify textures using
MPEG defined formats",
    "allOf":          [          {          "$ref":
"glTFChildOfRootProperty.schema.json" } ],
    "properties" : {
        "source": {
```

```
            "allOf": [ { "$ref": glTFid.schema.json" } ],
            "description": "The index of the MPEG media used
by this texture."
        },
        "track": {
            "allOf": [ { "$ref": "glTFid.schema.json" } ],
            "description": "The index of a track of the MPEG
media used by this texture."
        }
    }
}
MPEG_media.media.schema.json
{
    "$schema": "http://json-schema.org/draft-04/schema",
    "title": "MPEG media extension",
    "type": "object",
    "description": "MPEG media used to create a texture, audio
source or other objects in the scene.",
    "allOf":        [        {        "$ref":
"glTFChildOfRootProperty.schema.json" } ],
    "properties": {
        "media": {
            "type": "array",
            "description": "An array of MPEG media. A MPEG
media contains data refered by other object in a scene (e.g
MPEG_video_texture or MPEG_audio_source)",
            "items": {
                "$ref": "MPEG_media.media.schema.json"
            },
            "minItems": 1
        }
    }
}

MPEG_media.schema.json
{
    "$schema": "http://json-schema.org/draft-04/schema",
    "title": "Media",
    "type": "object",
    "description": "MPEG media used to create a texture, audio
source, or any other media type defined by MPEG. Media can be
referenced by URI or 'bufferView' index.",
    "allOf":        [        {        "$ref":
"glTFChildOfRootProperty.schema.json" } ],
    "properties": {
        "name": { },
        "alternatives": {
            "type": "array",
            "description": "An array of alternatives of the
same media (e.g. diffrent video code used)",
            "items": {
                "uri": {
                    "type": "string",
                    "description": "The uri of the media.",
                    "format": "uriref",
                    "gltf_detailedDescription": "The uri of
the media. Relative paths are relative to the .gltf file.",
                    "gltf_uriType": "media"
                },
                "mimeType": {
                    "anyOf": [
                        {
                            "enum": [ "video/mp4" ]
                        },
                        {
                            "enum": [ "application/dash+xml"
]
                        },
                        {
                            "type": "string"
                        }
                    ],
                    "description": "The MPEG media's MIME
type."
                },
                "bufferView": {
```

```
                    "allOf": [ { "$ref": "glTFid.schema.json"
} ],
                    "description": "The index of the
bufferView that contains the MPEG media. Use this instead of
the uri property."
                },
                "tracks": {
                    "type": "array",
                    "description": "List of all tracks in MPEG
media container (e.g. mp4 file or DASH manifest",
                    "items": {
                        "track": {
                            "type": "string",
                            "description": "URL fragments
e.g, DASH : Using MPD Anchors (URL fragments) as defined in
Annex C of 23009-1 (Table C.1). MP4: URL fragments as specified
in Annex L of ISOBMFF."
                        }
                    },
                    "minItems": 1
                }
            }
        },
        "required": ["mimeType" ],
        "dependencies": {
            "bufferView": [ "mimeType" ]
        },
        "oneOf": [
            { "required": [ "uri" ] },
            { "required": [ "bufferView" ] }
        ]
    }
}
```

Figure 3:
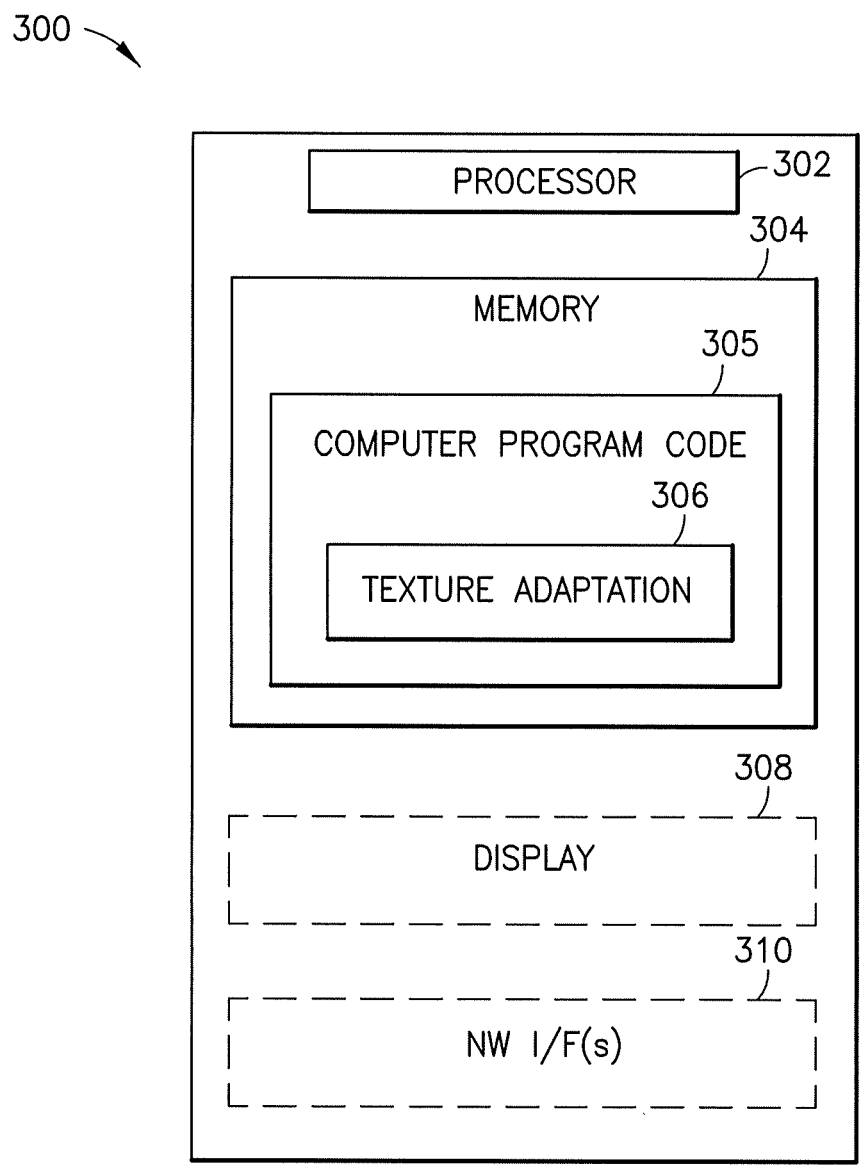
FIG. 3 is an example apparatus configured to implement texture adaptation, based on the examples described herein.

FIG. 3 is an example apparatus 300, which may be implemented in hardware, configured to implement texture adaptation based on the examples described herein. The apparatus 300 comprises a processor 302, at least one non-transitory memory 304 including computer program code 305, wherein the at least one memory 304 and the computer program code 305 are configured to, with the at least one processor 302, cause the apparatus to implement texture adaptation 306, which may be texture adaptation 306 circuitry), based on the examples described herein. The apparatus 300 optionally includes a display 308 that may be used to display adapted content during rendering. The apparatus 300 optionally includes one or more network (NW) interfaces (I/F(s)) 310. The NW I/F(s) 310 may be wired and/or wireless and communicate over the Internet/other network(s) via any communication technique. The NW I/F(s) 310 may comprise one or more transmitters and one or more receivers. The N/W I/F(s) 310 may comprise standard well-known components such as an amplifier, filter, frequency-converter, (de)modulator, and encoder/decoder circuitry(ies) and one or more antennas.

Figure 4:
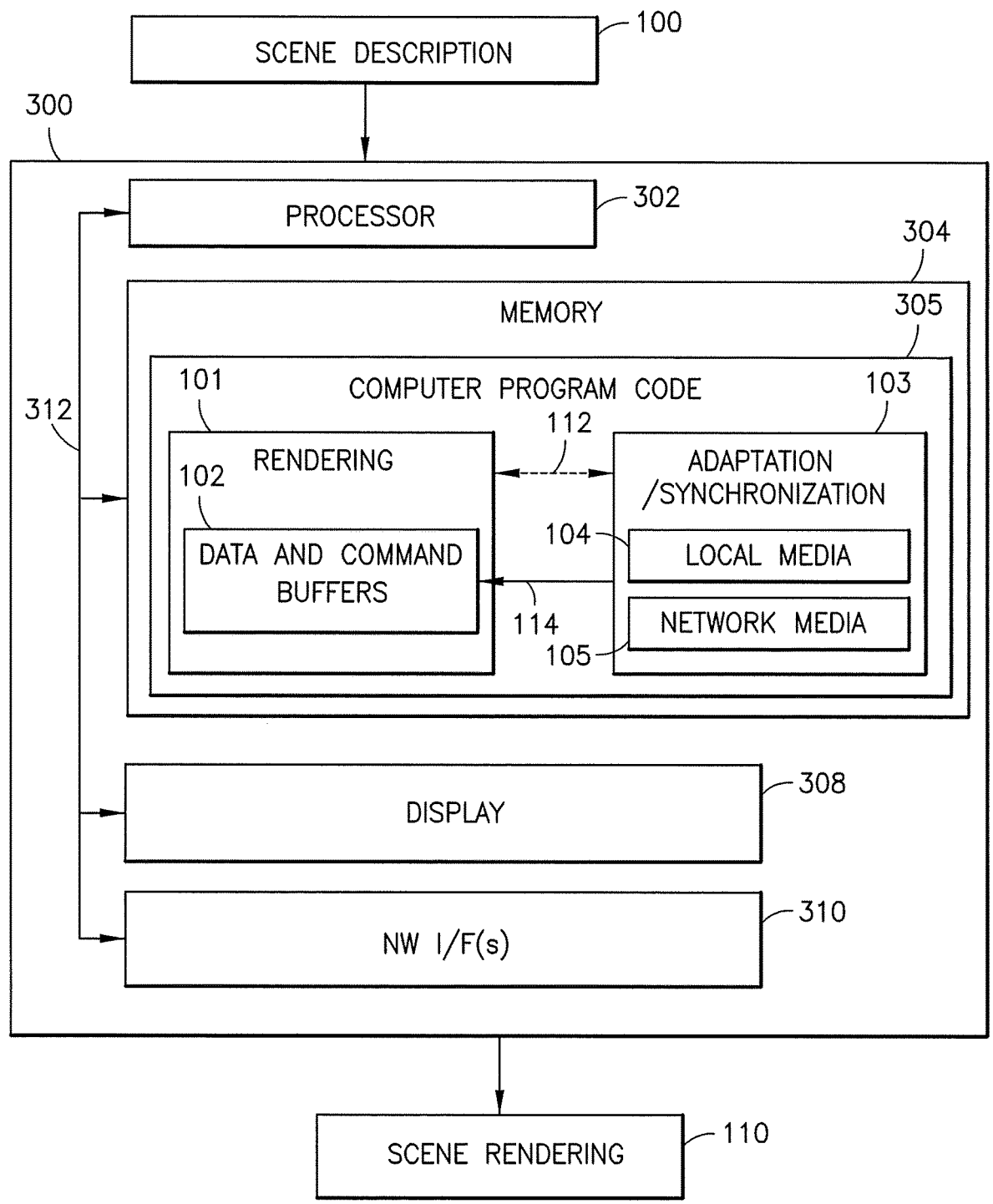
FIG. 4 is an embodiment of the example apparatus configured to implement texture adaptation, based on the examples described herein.

FIG. 4 is an embodiment of the apparatus 300. As shown in FIG. 4, the apparatus 300 comprises a processor 302, at least one non-transitory memory 304 including computer program code 305, wherein the at least one memory 304 and the computer program code 305 are configured to, with the at least one processor 302, cause the apparatus 300 to implement texture adaptation circuitry based on the examples described herein. The computer program code 305 comprises rendering 101 and adaptation/synchronization 103, implementing the configuration and functionality shown in FIG. 1. Rendering circuitry 101 comprises data and command buffers 102, which receives input 114 from adaptation/synchronization 103. Adaptation/synchronization circuitry 103 includes local media 104 and network media 105. Link 112 provides the interface between rendering 101 and adaptation/synchronization 103. In the embodiment shown in FIG. 4, the apparatus 300 includes a display 308 that may be used to display adapted content during rendering. The apparatus 300 further includes one or more network (NW) interfaces (I/F(s)) 310. The NW I/F(s) 310 may be wired and/or wireless and communicate over the Internet/other network(s) via any communication technique. The NW I/F(s) 310 may comprise one or more transmitters and one or more receivers. The N/W I/F(s) 310 may comprise standard well-known components such as an amplifier, filter, frequency-converter, (de)modulator, and encoder/decoder circuitry(ies) and one or more antennas. Bus 312 provides a communication interface and connection interface between the various components of apparatus 300. In FIG. 4, apparatus 300 receives as input the scene description 100, and as output provides scene rendering 110 of the scene.

Figure 5:
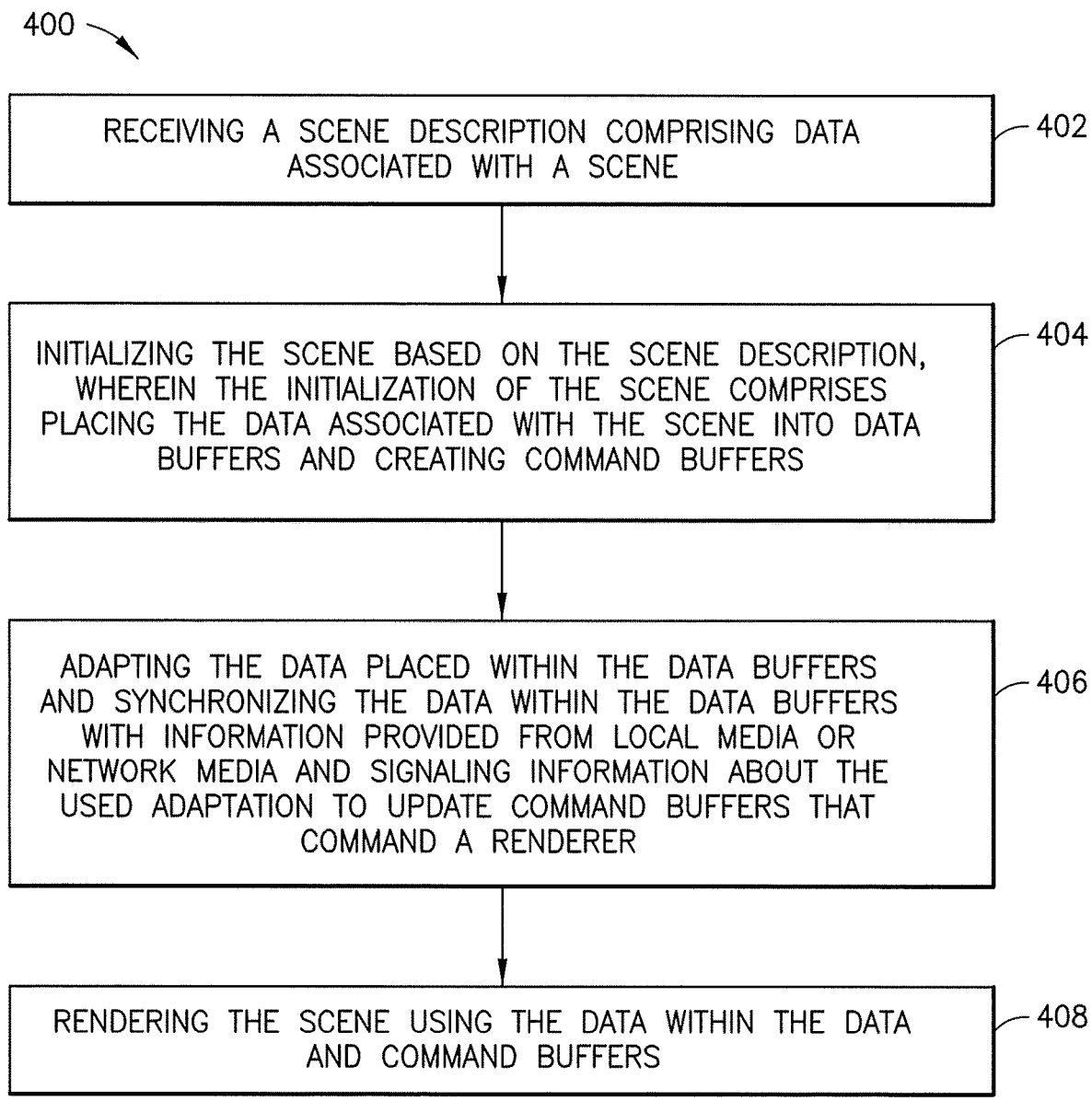
FIG. 5 is an example method to implement texture adaptation, based on the examples described herein.

FIG. 5 is an example method 400 to implement texture adaptation, based on the examples described herein. At 402, the method includes receiving a scene description comprising data associated with a scene. At 404, the method includes initializing the scene based on the scene description, wherein the initialization of the scene comprises placing the data associated with the scene into data buffers and creating command buffers. At 406, the method includes adapting the data placed within the data buffers and synchronizing the data within the data buffers with information provided from local media or network media and signaling information about the used adaptation to update command buffers that command a renderer. At 408, the method includes rendering the scene using the data within the data buffers and command buffers.

Figure 6:
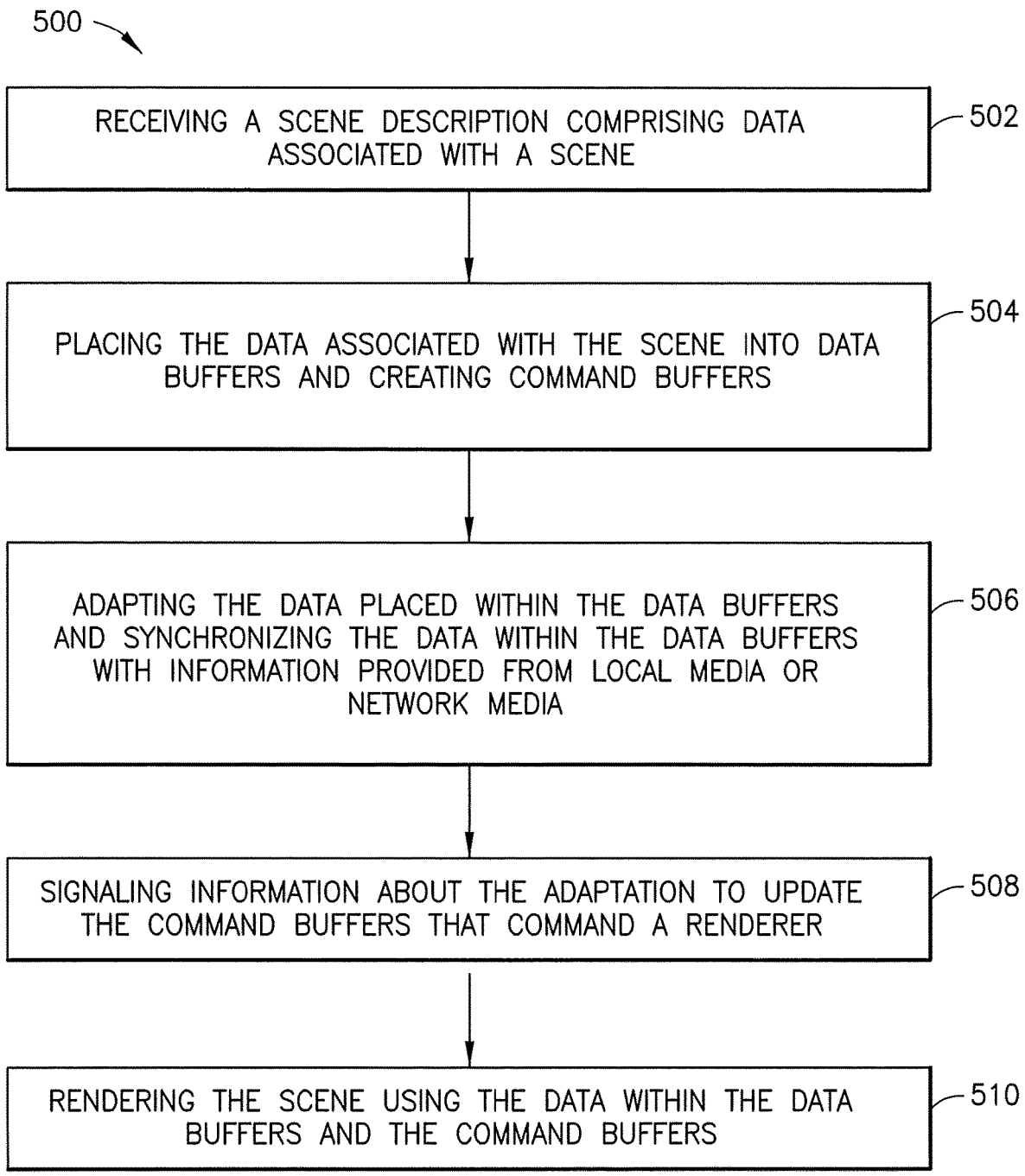
FIG. 6 is another example method to implement texture adaptation, based on the examples described herein.

FIG. 6 is another example method 500 to implement texture adaptation, based on the examples described herein. At 502, the method includes receiving a scene description comprising data associated with a scene. At 504, the method includes placing the data associated with the scene into data buffers and creating command buffers. At 506, the method includes adapting the data placed within the data buffers and synchronizing the data within the data buffers with information provided from local media or network media. At 508, the method includes signaling information about the adaptation to update the command buffers that command a renderer. At 510, the method includes rendering the scene using the data within the data buffers and the command buffers.

References to a 'computer', 'processor', etc. should be understood to encompass computers having different architectures such as single/multi-processor architectures and sequential (Von Neumann)/parallel architectures, as well as specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example apparatus includes at least one processor; and at least one non-transitory memory including computer program code; wherein the at least one memory and the computer program code are configured to, with the at least one processor, cause the apparatus at least to perform: receive a scene description comprising data associated with a scene; initialize the scene based on the scene description, wherein the initialization of the scene comprises placing the data associated with the scene into data buffers and creating command buffers; adapt the data placed within the data buffers and synchronize the data within the data buffers with information provided from local media or network media and signaling information about the used adaptation to update command buffers that command a renderer; and render the scene using the data within the data and command buffers.

The apparatus may further include wherein the scene description further comprises: a media list of timed media comprising an array of data representing an alternative to data within the data buffers; and a media link to link the media list with the data associated with the scene.

The apparatus may further include wherein the media link is an extension to a source element of a texture array based on a graphics library transmission format, and wherein the media link enables linking of a texture object to a media and its respective track listed in the media list of timed media.

The apparatus may further include wherein access information associated with a track is in the form of uniform resource locator fragments.

The apparatus may further include wherein a scheme associated with the uniform resource locator fragments comprises identification of at least one of an alternate group, a track group, or an entity group.

The apparatus may further include wherein access information associated with a track is in the form of a uniform resource locator query string.

The apparatus may further include wherein access information associated with a track is in the form of a query string that resolves into one or more media alternatives.

The apparatus may further include wherein information associated with a track is embedded into a uniform resource identifier instead of or in addition to having the information as a separate parameter for an entry.

The apparatus may further include wherein an entry in the media list refers to a set of alternatives representing a same media data as indicated within a referenced entry.

The apparatus may further include wherein the scene description is based on a graphics library transmission format, and the list of timed media is an extension of a graphics library transmission format specification.

The apparatus may further include wherein the at least one memory and the computer program code are further configured to, with the at least one processor, cause the apparatus at least to perform: provide for each alternative at least one of a uniform resource identifier, a multipurpose internet mail extensions type, or track information.

The apparatus may further include wherein the information provided from the local media or network media comprises at least one of: a current position of a user in the scene; or an orientation, size, or margin of a viewing frustum.

The apparatus may further include wherein: the local media is composition time of a base media file format; and the network media is timing information of periods in a dynamic adaptive streaming over hypertext transfer protocol media presentation description.

The apparatus may further include wherein the scene description is stored as an entity in an object-based file addressable and retrievable with a media handler.

An example method may include receiving a scene description comprising data associated with a scene; initializing the scene based on the scene description, wherein the initialization of the scene comprises placing the data associated with the scene into data buffers and creating command buffers; adapting the data placed within the data buffers and synchronize the data within the data buffers with information provided from local media or network media and signaling information about the used adaptation to update command buffers that command a renderer; and rendering the scene using the data within the data and command buffers.

The method may further include wherein the scene description further comprises: a media list of timed media comprising an array of data representing an alternative to data within the data buffers; and a media link to link the media list with the data associated with the scene.

The method may further include wherein the media link is an extension to a source element of a texture array based on a graphics library transmission format, and wherein the media link enables linking of a texture object to a media and its respective track listed in the media list of timed media.

The method may further include wherein access information associated with a track is in the form of uniform resource locator fragments.

The method may further include wherein a scheme associated with the uniform resource locator fragments comprises identification of at least one of an alternate group, a track group, or an entity group.

The method may further include wherein access information associated with a track is in the form of a uniform resource locator query string.

The method may further include wherein access information associated with a track is in the form of a query string that resolves into one or more media alternatives.

The method may further include wherein information associated with a track is embedded into a uniform resource identifier instead of or in addition to having the information as a separate parameter for an entry.

The method may further include wherein an entry in the media list refers to a set of alternatives representing a same media data as indicated within a referenced entry.

The method may further include wherein the scene description is based on a graphics library transmission format, and the list of timed media is an extension of a graphics library transmission format specification.

The method may further include providing for each alternative at least one of a uniform resource identifier, a multipurpose internet mail extensions type, or track information.

The method may further include wherein the information provided from the local media or network media comprises at least one of: a current position of a user in the scene; or an orientation, size, or margin of a viewing frustum.

The method may further include wherein: the local media is composition time of a base media file format; and the network media is timing information of periods in a dynamic adaptive streaming over hypertext transfer protocol media presentation description.

The method may further include wherein the scene description is stored as an entity in an object-based file addressable and retrievable with a media handler.

An example apparatus includes means for receiving a scene description comprising data associated with a scene; means for initializing the scene based on the scene description, wherein the initialization of the scene comprises placing the data associated with the scene into data buffers and creating command buffers; means for adapting the data placed within the data buffers and synchronize the data within the data buffers with information provided from local media or network media and signaling information about the used adaptation to update command buffers that command a renderer; and means for rendering the scene using the data within the data and command buffers.

An example non-transitory program storage device readable by a machine, tangibly embodying a program of instructions executable by the machine for performing operations may be provided, the operations comprising: receiving a scene description comprising data associated with a scene; initializing the scene based on the scene description, wherein the initialization of the scene comprises placing the data associated with the scene into data buffers and creating command buffers; adapting the data placed within the data buffers and synchronize the data within the data buffers with information provided from local media or network media and signaling information about the used adaptation to update command buffers that command a renderer; and rendering the scene using the data within the data and command buffers.

An example apparatus includes means for receiving a scene description comprising data associated with a scene; means for placing the data associated with the scene into data buffers and creating command buffers; means for adapting the data placed within the data buffers and synchronizing the data within the data buffers with information provided from local media or network media; means for signaling information about the adaptation to update the command buffers that command a renderer; and means for rendering the scene using the data within the data buffers and the command buffers.

Other aspects of the apparatus may include the following. The scene description may further include a media list of timed media comprising an array of data representing an alternative to data within the data buffers; and a media link to link the media list with the data associated with the scene. The media link may be an extension to a texture format; and the media link may be configured to link a graphics library transmission format texture object to a media and its respective track listed in the media list of timed media. Access information associated with the respective track may be in the form of uniform resource locator fragments. The uniform resource locator fragments associated with the respective track may include at least one of DASH media or MP4 media. Access information associated with a track may be in the form of a uniform resource locator query string. Access information associated with a track may be in the form of a query string that resolves into one or more media alternatives. Information associated with a track may be embedded into a uniform resource identifier instead of or in addition to having the information as a separate parameter for an entry. An entry in the media list may refer to one or more alternatives of a same media data as indicated within a referenced entry. The scene description may be based on a graphics library transmission format, and the list of timed media may be an extension of a graphics library transmission format specification. The apparatus may further include means for providing for each alternative at least one of a uniform resource identifier, a multipurpose internet mail extensions type, or track information. The information provided from the local media or network media may include at least one of: a translation of a scene node; a rotation of a scene node; or an intrinsic camera parameter of a camera object. The local media may be a media file format; and the network media may be a dynamic adaptive streaming over hypertext transfer protocol manifest. The scene description may be stored as an entity in an object-based file addressable and retrievable with a media handler. The media list of timed media may be a MPEG media extension array; the data within the data buffers may be a gltf accessor; and the media link may be at least one of a MPEG texture video extension, a MPEG viewport recommended extension, or a MPEG animation extension. The one or more alternatives of the same media may be an array.

An example apparatus includes at least one processor; and at least one non-transitory memory including computer program code; wherein the at least one memory and the computer program code are configured to, with the at least one processor, cause the apparatus at least to perform: receive a scene description comprising data associated with a scene; place the data associated with the scene into data buffers and create command buffers; adapt the data placed within the data buffers and synchronize the data within the data buffers with information provided from local media or network media; signal information about the adaptation to update the command buffers that command a renderer; and render the scene using the data within the data buffers and the command buffers.

Other aspects of the apparatus may include the following. The scene description may further include a media list of timed media comprising an array of data representing an alternative to data within the data buffers; and a media link to link the media list with the data associated with the scene. The media link may be an extension to a texture format; and the media link may be configured to link a graphics library transmission format texture object to a media and its respective track listed in the media list of timed media. Access information associated with the respective track may be in the form of uniform resource locator fragments. The uniform resource locator fragments associated with the respective track may include at least one of DASH media or MP4 media. Access information associated with a track may be in the form of a uniform resource locator query string. Access information associated with a track may be in the form of a query string that resolves into one or more media alternatives. Information associated with a track may be embedded into a uniform resource identifier instead of or in addition to having the information as a separate parameter for an entry. An entry in the media list may refer to one or more alternatives of a same media data as indicated within a referenced entry. The scene description may be based on a graphics library transmission format, and the list of timed media may be an extension of a graphics library transmission format specification. The at least one memory and the computer program code may be further configured to, with the at least one processor, cause the apparatus at least to perform: provide for each alternative at least one of a uniform resource identifier, a multipurpose Internet mail extensions type, or track information. The information provided from the local media or network media may include at least one of: a translation of a scene node; a rotation of a scene node; or an intrinsic camera parameter of a camera object. The local media may be a media file format; and the network media may be a dynamic adaptive streaming over hypertext transfer protocol manifest. The scene description may be stored as an entity in an object-based file addressable and retrievable with a media handler. The media list of timed media may be a MPEG media extension array; the data within the data buffers may be a gltf accessor; and the media link may be at least one of a MPEG texture video extension, a MPEG viewport recommended extension, or a MPEG animation extension. The one or more alternatives of the same media may be an array.

An example method includes receiving a scene description comprising data associated with a scene; placing the data associated with the scene into data buffers and creating command buffers; adapting the data placed within the data buffers and synchronizing the data within the data buffers with information provided from local media or network media; signaling information about the adaptation to update the command buffers that command a renderer; and rendering the scene using the data within the data buffers and the command buffers.

Other aspects of the method may include the following. The scene description may further include a media list of timed media comprising an array of data representing an alternative to data within the data buffers; and a media link to link the media list with the data associated with the scene. The media link may be an extension to a texture format; and the media link may be configured to link a graphics library transmission format texture object to a media and its respective track listed in the media list of timed media. Access information associated with the respective track may be in the form of uniform resource locator fragments. The uniform resource locator fragments associated with the respective track may include at least one of DASH media or MP4 media. Access information associated with a track may be in the form of a uniform resource locator query string. Access information associated with a track may be in the form of a query string that resolves into one or more media alternatives. Information associated with a track may be embedded into a uniform resource identifier instead of or in addition to having the information as a separate parameter for an entry. An entry in the media list may refer to one or more alternatives of a same media data as indicated within a referenced entry. The scene description may be based on a graphics library transmission format, and the list of timed media may be an extension of a graphics library transmission format specification. The method may further include providing for each alternative at least one of a uniform resource identifier, a multipurpose internet mail extensions type, or track information. The information provided from the local media or network media may include at least one of: a translation of a scene node; a rotation of a scene node; or an intrinsic camera parameter of a camera object. The local media may be a media file format; and the network media may be a dynamic adaptive streaming over hypertext transfer protocol manifest. The scene description may be stored as an entity in an object-based file addressable and retrievable with a media handler. The media list of timed media may be a MPEG media extension array; the data within the data buffers may be a gltf accessor; and the media link may be at least one of a MPEG texture video extension, a MPEG viewport recommended extension, or a MPEG animation extension. The one or more alternatives of the same media may be an array.

An example non-transitory program storage device readable by a machine, tangibly embodying a program of instructions executable by the machine for performing operations is provided, the operations comprising: receiving a scene description comprising data associated with a scene; placing the data associated with the scene into data buffers and creating command buffers; adapting the data placed within the data buffers and synchronizing the data within the data buffers with information provided from local media or network media; signaling information about the adaptation to update the command buffers that command a renderer; and rendering the scene using the data within the data buffers and the command buffers.

Other aspects of the non-transitory program storage device may include the following. The scene description may further include a media list of timed media comprising an array of data representing an alternative to data within the data buffers; and a media link to link the media list with the data associated with the scene. The media link may be an extension to a texture format; and the media link may be configured to link a graphics library transmission format texture object to a media and its respective track listed in the media list of timed media. Access information associated with the respective track may be in the form of uniform resource locator fragments. The uniform resource locator fragments associated with the respective track may include at least one of DASH media or MP4 media. Access information associated with a track may be in the form of a uniform resource locator query string. Access information associated with a track may be in the form of a query string that resolves into one or more media alternatives. Information associated with a track may be embedded into a uniform resource identifier instead of or in addition to having the information as a separate parameter for an entry. An entry in the media list may refer to one or more alternatives of a same media data as indicated within a referenced entry. The scene description may be based on a graphics library transmission format, and the list of timed media may be an extension of a graphics library transmission format specification. The operations of the non-transitory program storage device may further include providing for each alternative at least one of a uniform resource identifier, a multipurpose internet mail extensions type, or track information. The information provided from the local media or network media may include at least one of: a translation of a scene node; a rotation of a scene node; or an intrinsic camera parameter of a camera object. The local media may be a media file format; and the network media may be a dynamic adaptive streaming over hypertext transfer protocol manifest. The scene description may be stored as an entity in an object-based file addressable and retrievable with a media handler. The media list of timed media may be a MPEG media extension array; the data within the data buffers may be a gltf accessor; and the media link may be at least one of a MPEG texture video extension, a MPEG viewport recommended extension, or a MPEG animation extension. The one or more alternatives of the same media may be an array.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code;
   wherein the at least one memory and the computer program code are configured to, with the at least one processor, cause the apparatus at least to:
   receive a scene description comprising data associated with a scene;
   place the data associated with the scene into data buffers and create command buffers;
   adapt the data placed within the data buffers and synchronize the data within the data buffers with information provided from local media or network media;
   signal information about the adaptation to update the command buffers that command a renderer; and
   render the scene using the data within the data buffers and the command buffers;
   where the scene description further comprises: a media list of timed media comprising an array of data representing an alternative to data within the data buffers; and a media link to link the media list with the data associated with the scene.

2. The apparatus of claim 1, where:
   the media link is an extension to a texture format; and
   the media link is configured to link a graphics library transmission format texture object to a media and its respective track listed in the media list of timed media.

3. The apparatus of claim 2, where access information associated with the respective track is in the form of uniform resource locator fragments.

4. The apparatus of claim 3, where the uniform resource locator fragments associated with the respective track comprise at least one of DASH media or MP4 media.

5. The apparatus of claim 1, where an entry in the media list refers to one or more alternatives of a same media data as indicated within a referenced entry.

6. The apparatus of claim 1, where the scene description is based on a graphics library transmission format, and the list of timed media is an extension of a graphics library transmission format specification.

7. The apparatus of claim 1, wherein the at least one memory and the computer program code are further configured to, with the at least one processor, cause the apparatus at least to:
   provide for each alternative at least one of a uniform resource identifier, a multipurpose internet mail extensions type, or track information.

8. The apparatus of claim 1, where the information provided from the local media or network media comprises at least one of:
   a translation of a scene node;
   a rotation of a scene node; or
   an intrinsic camera parameter of a camera object.

9. The apparatus of claim 1, where:
   the local media is a media file format; and
   the network media is a dynamic adaptive streaming over hypertext transfer protocol manifest.

10. A method comprising:
receiving a scene description comprising data associated with a scene;
placing the data associated with the scene into data buffers and creating command buffers;
adapting the data placed within the data buffers and synchronizing the data within the data buffers with information provided from local media or network media;
signaling information about the adaptation to update the command buffers that command a renderer; and
rendering the scene using the data within the data buffers and the command buffers;
where the scene description further comprises: a media list of timed media comprising an array of data representing an alternative to data within the data buffers; and a media link to link the media list with the data associated with the scene.

11. The method of claim 10, where:
the media link is an extension to a texture format; and
the media link is configured to link a graphics library transmission format texture object to a media and its respective track listed in the media list of timed media.

12. The method of claim 11, where access information associated with the respective track is in the form of uniform resource locator fragments.

13. The method of claim 12, where the uniform resource locator fragments associated with the respective track comprise at least one of DASH media or MP4 media.

14. The method of claim 10, where an entry in the media list refers to one or more alternatives of a same media data as indicated within a referenced entry.

15. The method of claim 10, where the scene description is based on a graphics library transmission format, and the list of timed media is an extension of a graphics library transmission format specification.

16. The method of claim 10, further comprising providing for each alternative at least one of a uniform resource identifier, a multipurpose internet mail extensions type, or track information.

17. The method of claim 10, where the information provided from the local media or network media comprises at least one of:
a translation of a scene node;
a rotation of a scene node; or
an intrinsic camera parameter of a camera object.

18. The method of claim 10, where:
the local media is a media file format; and
the network media is a dynamic adaptive streaming over hypertext transfer protocol manifest.

* * * * *